United States Patent [19]
Anthony

[11] Patent Number: 5,390,532
[45] Date of Patent: Feb. 21, 1995

[54] TEST APPARATUS FOR A FLUID DISPENSING SYSTEM

[76] Inventor: Mark Anthony, 8073 43rd Ave., Kenosha, Wis. 53142

[21] Appl. No.: 138,417

[22] Filed: Oct. 18, 1993

[51] Int. Cl.⁶ .................... G01M 3/00; G01M 3/28
[52] U.S. Cl. .................. 73/40.5 R; 73/49.1; 73/46
[58] Field of Search .......... 73/40.5 R, 40, 49.1, 73/46

[56] References Cited

U.S. PATENT DOCUMENTS

| | | | |
|---|---|---|---|
| 1,901,432 | 3/1933 | Bradley | 73/40.5 |
| 3,444,724 | 5/1969 | Gilpin | 73/40.5 |
| 3,756,072 | 9/1973 | MacMurray | 73/40.5 |
| 3,910,102 | 10/1975 | McLean | 73/40.5 R |
| 3,958,449 | 5/1976 | Drescher et al. | 73/40.5 R |
| 4,673,926 | 6/1987 | Gorman | 340/605 |
| 4,805,444 | 2/1989 | Webb | 73/40.5 R |
| 4,901,751 | 2/1990 | Story et al. | 137/312 |
| 4,932,257 | 6/1990 | Webb | 73/40.5 R |
| 4,939,923 | 7/1990 | Sharp | 73/40.5 R |
| 4,984,448 | 1/1991 | Jordan et al. | 73/40.5 R |
| 5,052,216 | 10/1991 | Sharp | 73/49.2 |
| 5,072,621 | 12/1991 | Hasselmann | 73/49.1 |
| 5,072,622 | 12/1991 | Roach et al. | 73/40.5 R |
| 5,131,262 | 7/1992 | Wood et al. | 73/40.5 R |
| 5,157,958 | 10/1992 | Geisinger | 73/40.5 R |
| 5,176,025 | 1/1993 | Butts | 73/40.5 R |
| 5,277,455 | 1/1994 | Graves et al. | 285/55 |

FOREIGN PATENT DOCUMENTS

| | | | |
|---|---|---|---|
| 648665 | 3/1985 | Germany | 73/49.2 T |
| 56-126298 | 2/1983 | Japan | 73/40.5 R |

Primary Examiner—Hezron E. Williams
Assistant Examiner—J. David Wiggins
Attorney, Agent, or Firm—Jansson & Shupe, Ltd.

[57] ABSTRACT

Disclosed is a pressure apparatus for use in analyzing the leak integrity of a fluid dispensing system such as a system used to dispense gasoline from an underground storage tank into a motor vehicle. The apparatus includes at least one pressure device (e.g., a pressure gauge and/or a quick-connect fitting) having its own enclosure. The apparatus has an additional containment structure substantially surrounding the device enclosure so that inadvertent fluid leaks are captured by the structure. Also disclosed is a fluid dispensing system incorporating one or more apparatus. The apparatus is particularly useful for carrying out periodic inspections of the system to help assure that it is substantially leak-free.

17 Claims, 3 Drawing Sheets

TEST APPARATUS FOR A FLUID DISPENSING SYSTEM

FIELD OF THE INVENTION

This invention relates generally to measuring and testing apparatus and, more particularly, to such apparatus used with fluid handling systems.

BACKGROUND OF THE INVENTION

Systems for handling and dispensing fluids, either liquid or gaseous, are in wide use for a variety of purposes. Among such systems are those used to handle and dispense liquids which are, to a greater or lesser degree, hazardous to life forms, e.g., humans, plants or animals. Such liquids may be caustic, corrosive, flammable or explosive and in addition to being hazardous to life forms, are capable of damaging the atmospheric or soil environment.

An exemplary type of such system is used to dispense hydrocarbon liquids such as oil, kerosene, diesel fuel, jet fuel or gasoline. U.S. Pat. No. 3,910,102 (McLean) depicts such a system used to dispense gasoline.

Gasoline dispensing systems represent a particularly important example of systems of the foregoing types. This is so since such dispensing systems are in very wide use (every automobile filling station has at least one) and because gasoline is a volatile organic compound (VOC) which evaporates quickly into the atmosphere.

Further, gasoline rapidly soaks into the earth and can pollute underground water aquifers, an important source of drinking water. And the expense related to cleaning up an inadvertent gasoline spill can be enormous—it is not an exaggeration to say that a groundsoaking spill involving $100 worth of gasoline may require an expenditure in the range of $50,000–100,000 to clean up.

A corollary fact is that gasoline dispensing systems (and perhaps other types of systems handling hazardous liquids) are periodically required to be tested, at least under current federal regulations. Such testing involves, among other things, diagnostic tests (conducted using test ports and/or temporarily-installed fittings) intended to determine whether or not the system may be leaking liquid into the environment. Japan patent document 58-27041 and U.S. Pat. No. 3,958,449 (Drescher et al.) both relate to methods for detecting a pipe line leak.

Current gasoline dispensing systems are equipped with a leak detector which is usually mounted very near the underground storage tank or near the pump used to draw gasoline from such tank. To perform system integrity tests, the leak detector is removed and a special test attachment temporarily installed in its place.

Current systems also have an impact valve located directly beneath the gasoline dispenser or "pump" as it is referred to by most motorists. The impact valve automatically closes if the liquid-carrying pipe is sheared off as when a vehicle strikes the pump at sufficient speed. Such impact valve has a test port used (after removing the port plug) for making system integrity tests.

Such current systems are characterized by certain disadvantages. Other than the aforedescribed test points (at the leak detector location and at the impact valve), the only way to obtain one or more additional test points is to open the line carrying gasoline (usually by removing a pipe union) and install the necessary hardware for each desired point. There is no provision for bleeding line pressure down to ambient so that such line can be opened without resulting in gasoline squirting geyser-like when the line is opened. A spill is all but inevitable when opening such a line in that way. And there is no satisfactory provision for "dividing" the length of the liquid-carrying line into several discrete lengths which can be separately tested to determine whether that particular length is leaking.

Another disadvantage relates to the actual testing activity. When conducting a test, test port plugs are removed and a test device, e.g., a gauge, a source of pressurized inert gas (nitrogen or the like), is attached to the port. In so doing, a liquid spill is very likely to occur. For example, if the port is somewhat below liquid level in, say, a pump/turbine housing, the liquid will drain out the port by force of gravity until the level of such liquid reaches that of the port.

And the system may have a pressurized vapor or air "bubble" trapped somewhere in it. Opening a port permits the pressurized "bubble" to expand, forcing liquid out the port. While the amount of liquid so spilled is often relatively modest, perhaps a gallon or less, spills of several gallons are not unusual.

Yet another disadvantage of current systems is that such test ports are in places which are difficult to reach or work in. The space below the dispenser is very crowded. The resulting frustration of the testing technician has caused more than one unscrupulous technician to fail to conduct a proper test and yet give a favorable report on the system's integrity.

A test apparatus which addresses such disadvantages would be an important advance in the art.

OBJECTS OF THE INVENTION

It is an object of the invention to provide an improved test apparatus overcoming some of the problems and shortcomings of the prior art.

Another object of the invention is to provide an improved test apparatus which helps protect the environment and life forms.

Another object of the invention is to provide an improved test apparatus which helps avoid spills of hazardous liquids.

Yet another object of the invention is to provide an improved test apparatus useful in bleeding a liquid dispensing system.

Another object of the invention is to provide an improved test apparatus which makes it very convenient and easy to conduct system integrity tests.

Still another object of the invention is to provide an improved test apparatus which avoids the necessity of attaching a pressure gauge to the system.

Another object of the invention is to provide an improved test apparatus useful to introduce pressurized gas into a fluid dispensing system or to hydrostatically test such a system. How these and other objects are accomplished will become apparent from the following descriptions and from the drawing.

SUMMARY OF THE INVENTION

The invention involves a pressure apparatus for use in analyzing the leak integrity of a fluid dispensing system such as a system used to dispense gasoline from an underground storage tank into a motor vehicle. The apparatus is particularly useful for carrying out periodic inspections of the system to help assure that it is substantially leak-free.

The new apparatus includes a pressure device, e.g., a pressure gauge and/or a quick connect fitting, having its own enclosure. A containment structure (in the nature of a secondary or "redundant" enclosure) substantially surrounds the device enclosure or, with two devices, the enclosures of both. Thus, inadvertent fluid leaks from a pressure device are captured by the structure rather than being permitted to pollute the air or earth.

In one highly preferred arrangement, the pressure device is an enclosed pressure gauge. The containment structure includes a transparent panel and the gauge and the panel are relatively oriented so that the gauge is visible through the panel. Thus, there is no need to open the containment structure to read the gauge. However, the transparent panel is preferably removable so that the interior of the containment structure can be accessed if necessary.

Preferably, the containment structure also includes an opaque, removable cover member to permit access to a quick connect fitting that may be included in the apparatus. Or, in the alternative, the apparatus may include only a single pressure device embodied as a quick connect fitting for attaching a pressure source, e.g., an inert gas compressor or a tank of compressed inert gas, to the apparatus.

In another aspect of the invention, the fluid dispensing system has a rated pressure. For example, the rated pressure of gasoline dispensing systems used at filling stations is on the order of 26 p.s.i. The containment structure defines a pressure vessel having a rated pressure about twice that of the fluid dispensing system. In that way, the containment structure has a "safety factor" so that liquid discharging from a leaking device inside the apparatus is trapped by the surrounding redundant structure and such structure itself is not likely to start to leak. Pollution is thereby prevented.

In yet another aspect, the inventive apparatus is used in combination with a fluid dispensing system. Such system has a flow path connecting (a) a tank-like reservoir, (b) a pump, and (c) a fluid dispenser. Liquid is drawn from the reservoir by the pump and delivered along the flow path to the dispenser at the demand of the purchaser.

The flow path includes at least one valve, e.g., a ball-type isolating valve, dividing the path into a first path segment and a second path segment. A first test apparatus is mounted in flow communication with the first path segment. Most preferably, the combination also includes a second test apparatus in flow communication with the second path segment. When each apparatus is configured to include a pressure gauge, pressure in any isolated segment can be monitored.

Further details of the invention are set forth in the following detailed description and in the drawing.

DETAILED DESCRIPTION OF PREFERRED EMBODIMENTS

Figure 1:
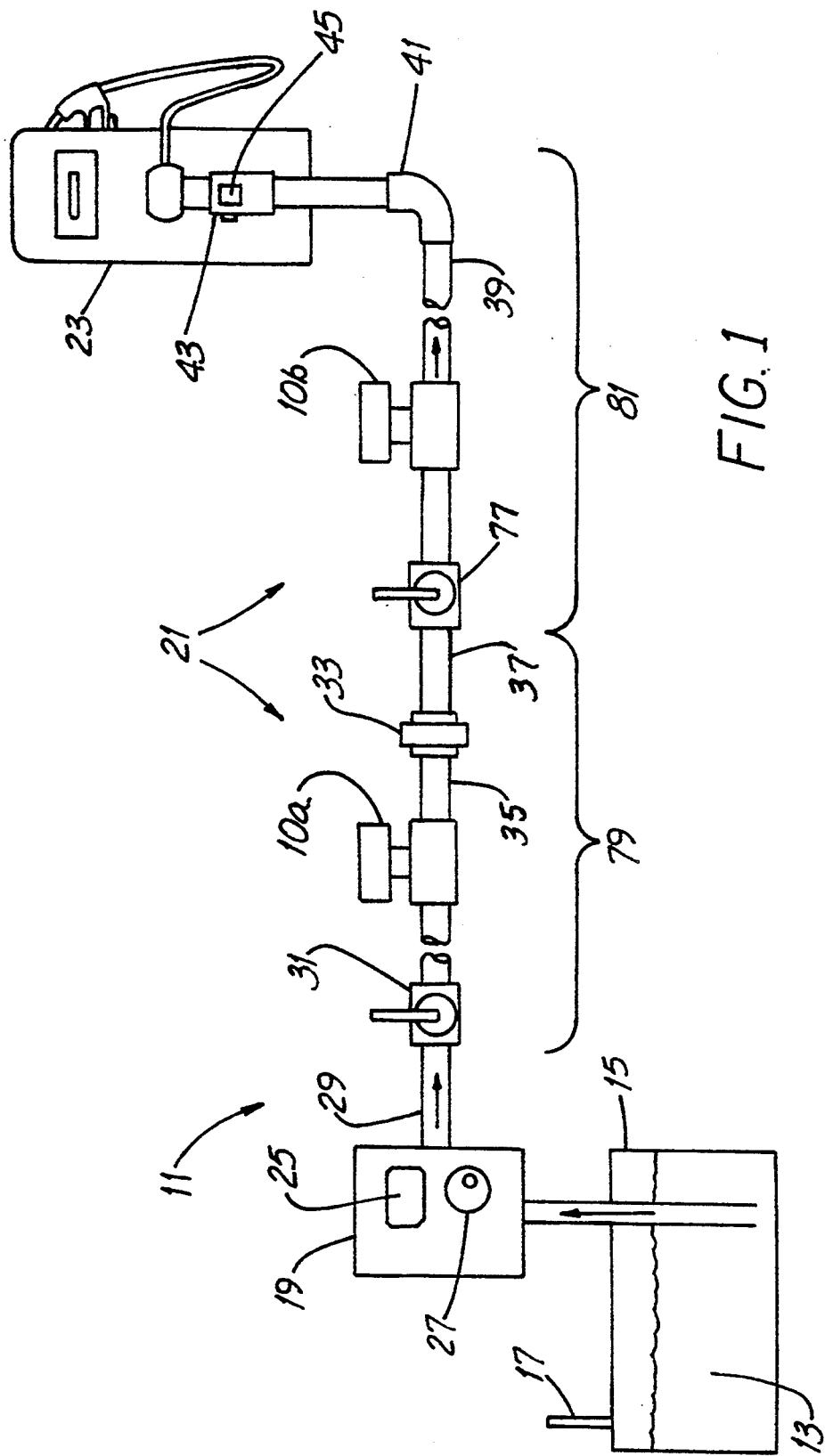
FIG. 1 is a representative side elevation view of an exemplary fluid dispensing system. Parts are broken away.

Referring to FIG. 1, before describing details of the inventive pressure apparatus 10, it will be helpful to have a general understanding of the configuration and operation of an exemplary fluid dispensing system 11. The illustrated system 11 is used for dispensing gasoline 13 into a motor vehicle and such system 11 typifies those in use at what the consumer usually refers to as "filling stations" or "gas stations."

The system 11 includes an underground storage tank or reservoir 15 maintained substantially at atmospheric pressure by a vent 17. The reservoir 15 contains liquid gasoline 13 drawn therefrom by a pump 19 (typically a turbine pump) and delivered to a pipe flow path 21 leading to the gas pump or dispenser 23.

A leak detector 25 is usually mounted at the pump 19 and a valve-like element 27 is mounted at the pump output port. The element 27 can be closed to isolate the pump 19 and the flow path 21 from one another by, in effect, closing off the pipe 29. The system 11 also has an isolating valve 31, preferably of the ball type, which can also be used to close off the pipe 29. In that respect, such valve 31 is redundant to the element 27 but is usually included since, over time, the valve 31 is much more reliable than the element 27.

A pipe union 33 is used at one or more locations along the flow path 21 to join lengths of pipe 35, 37 together. The last "downstream" length of pipe 39 is terminated in an elbow 41 connected to an impact valve 43. The impact valve 43 is an automatic closure device configured to shut off flow through the pipe 39 in the event the dispenser 23 is struck by a vehicle, for example, and broken away from its concrete pedestal.

In known arrangements, test or "access" points into the system 11 are at the leak detector 25, at a pipe union 33 or at the impact valve 43. To conduct tests by access at the leak detector 25, such detector 25 has to be temporarily removed or at least partially disassembled.

To conduct tests by access at a pipe union 33, the union 33 has to be opened, parts removed and testing equipment temporarily installed. Often, the union 33 is opened while the flow path 21 is under pressure and a good deal of gasoline 13 leaks to the environment, sometimes as a highly flammable spray.

Only the impact valve 43 has a test port 45. Such port 45 is normally closed with a plug but when the plug is removed (as it is designed to be) an access point into the system 11 is available for conducting tests. A way in which such tests are generally conducted is described below.

Figure 2:
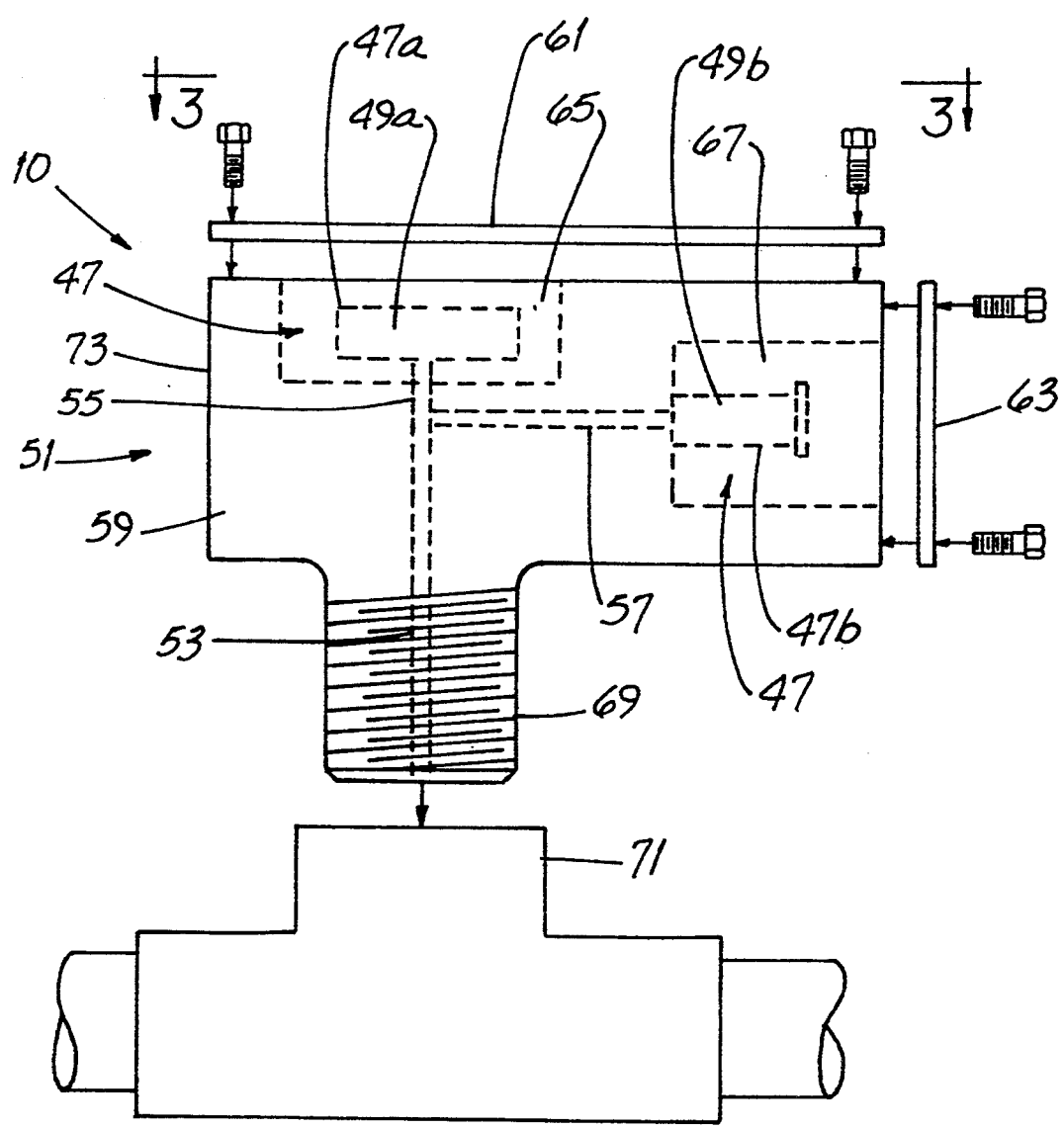
FIG. 2 is a side elevation view of the inventive test apparatus, shown partially "exploded," and shown in conjunction with a pipe "T" fitting. Interior surfaces of certain parts are shown in dashed outline.
Figure 3:
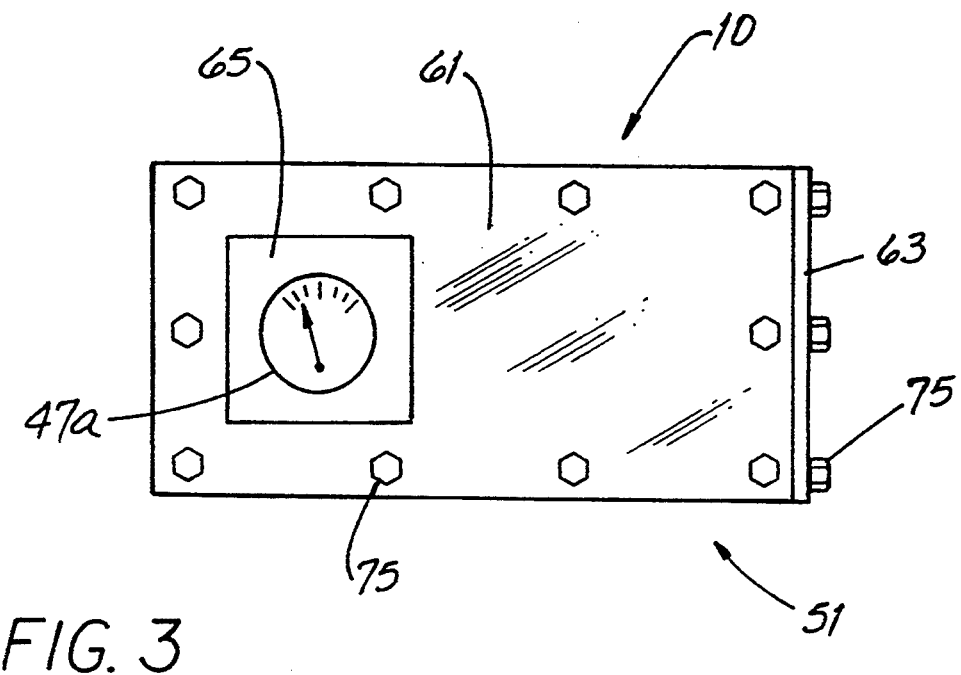
FIG. 3 is a top plan view of the apparatus shown in FIG. 2 taken generally along the viewing plane 3—3 thereof.
Figure 4:
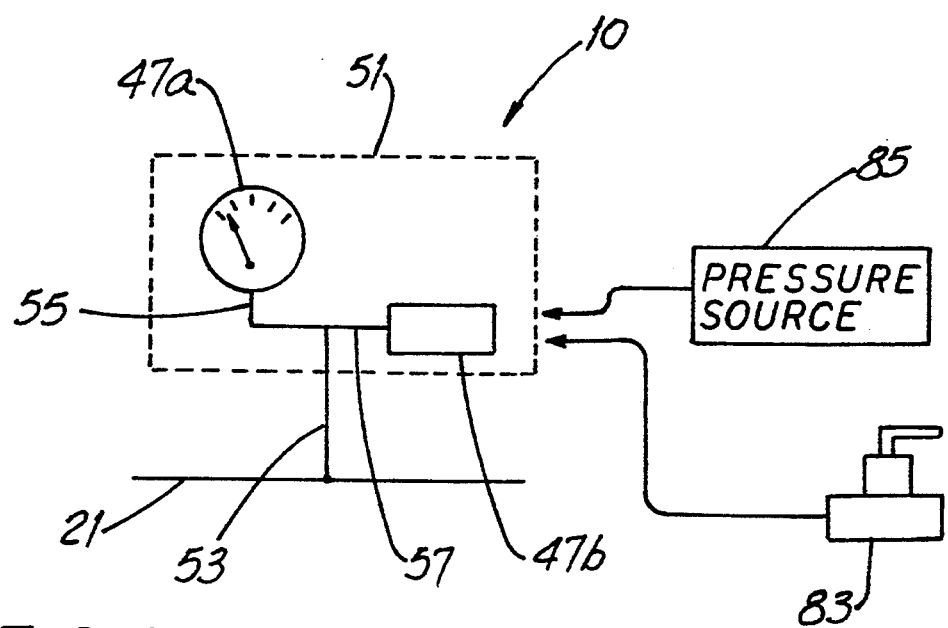
FIG. 4 is a simplified diagram of the apparatus shown in conjunction with a pipe flow path, a pressure source and a bleed valve. The containment structure of the apparatus is shown in dashed outline.

Referring additionally to FIGS. 2, 3 and 4, the invention involves a pressure apparatus 10 for use in analyzing the leak integrity of a fluid dispensing system such as the system 11. The new apparatus 10 includes a pressure device 47, e.g., a pressure gauge 47a and/or a quick connect fitting 47b, each having its own enclosure 49a, 49b respectively. A containment structure 51 (in the nature of a secondary or "redundant" enclosure) substantially surrounds the device enclosure 49a or 49b or, with two devices 47, the enclosures 49a, 49b of both. Thus, inadvertent fluid leaks from a pressure device 47 are captured by and confined within the structure 51 rather than being permitted to pollute the air or earth.

As best seen in FIG. 2, the apparatus 10 has a test passage 53 that branches to a gauge passage 55 and a fitting passage 57. The pressure gauge 47a is connected to the passage 55 and the fitting 47b is connected to the passage 57. It is to be appreciated that while the illustrated apparatus 10 is likely to be most universally useful, such apparatus 10 may be equipped with only a gauge 47a or with only a fitting 47b. In such instances, a passage 57 or 55, respectively, is omitted or simply plugged.

In one exemplary embodiment, the containment structure 51 includes a box-like housing 59 having a transparent closure panel 61 and an opaque cover member 63. In one version of the invention, the housing 59 has a separate cavity 65, 67 for receiving the gauge 47a and the fitting 47b, respectively. Such cavities 65, 67 are closed by the panel 61 and the member 63, respectively. In that configuration, a leak from, say, the gauge 47a is not only isolated from the environment, it is also isolated from the fitting 47b. However, the apparatus 10 provides highly satisfactory results if the housing 59 has but a single cavity receiving both the gauge 47a and the fitting 47b.

The transparent panel 61 and the gauge 47a are relatively oriented so that the gauge 47a is visible through the panel 61. Thus, there is no need to open the containment structure 51 to read the gauge 47a. However, the transparent panel 61 is preferably removable so that the cavity 65 can be accessed to replace the gauge 47a, for example, or for other reasons.

The apparatus 10 may also include a connection nipple 69 for attaching the apparatus 10 to a standard "T" pipe fitting 71. The nipple 69 has threads 70 for connection of the apparatus 10 to the threaded fitting 71 and for removing such apparatus 10 from the fitting 71. And, of course, the nipple 69 can be supplied separately and fitted to the apparatus on site as such apparatus 10 is being installed.

In another aspect of the invention, it is to be appreciated that the fluid dispensing system 11 has a nominal rated pressure at which the pump 19 delivers liquid to the dispenser 23. For example, the rated pressure of gasoline dispensing systems used at filling stations is on the order of 26 p.s.i.

The containment structure 51 is configured and arranged to define a pressure vessel 73 having a rated pressure about twice that of the fluid dispensing system 11. In that way, the containment structure 51 has a "safety factor" so that liquid discharging from a leaking device 47 inside the apparatus 10 is trapped by the surrounding redundant structure 51 and such structure 51 itself is not likely to start to leak. Pollution is thereby prevented.

Merely by way of example, brass is a preferred material for the housing 59 and the member 63. The panel 61 is of glass or plastic having a thickness and other physical characteristics selected to withstand about twice the rated pressure of the system 11 without failure. Similarly, the number, type and location of fasteners 75 is selected with such pressure in mind.

Referring particularly to FIG. 1, in yet another aspect of the invention, the inventive apparatus 10 is used in combination with the illustrated fluid dispensing system 11. The flow path 21 includes at least one valve 77, e.g., a ball-type isolating valve, dividing the path 21 into a first path segment 79 and a second path segment 81. A first test apparatus 10a is mounted in flow communication with the first path segment 79.

Most preferably, the combination also includes a second test apparatus 10b in flow communication with the second path segment 81. When each apparatus 10a, 10b is configured to include a pressure gauge 47a, pressure in any isolated segment 79, 81 can be monitored and the "integrity" of such segment 79, 81, i.e., the ability of such segment 79, 81 to hold liquid under pressure without leaking, can be determined.

After considering FIG. 1 and the above explanation, it will be appreciated that the flow path 21 may be divided into a number of segments like segments 79 and 81. For example, aircraft fueling systems at commercial airports or military bases may involve flow paths which are hundreds or even thousands of feet long. When conducting system integrity tests or when attempting to locate a leak, it is very helpful to be able to divide the very long flow path into shorter "pieces," each of which can be separately tested. In preferred systems 11, the apparatus 10 is permanently installed, either during initial construction or on a retrofit basis.

A way in which integrity tests are conducted using the apparatus will now be described. Referring particularly to FIGS. 1, 2 and 4, it is assumed that the flow segment 79 is selected for test, either as a matter of routine (as mandated by current regulations) or because such segment 79 is suspected of having a leak. To test the segment 79, isolating valves 31 and 77 are closed. If the segment 79 is under pressure, the rate of pressure decrease can be ascertained by watching the gauge 47a on apparatus 10a. Such rate will indicate to an experienced technician whether or not the segment 79 is leaking.

On the other hand, the technician may wish to relieve the pressure in the segment 79. In that instance, the member 63 is removed and a bleed valve 83 attached to the fitting 47b. The valve 83 is opened in a controlled manner to reduce pressure to atmospheric pressure and any liquid flowing out of the valve 83 can be caught in a suitable receptacle.

Thereupon, the bleed valve 83 is removed from the fitting 47b and a pressure source 85 such as an inert gas compressor is connected to such fitting 47b. The pressure in the segment 79 can then be increased to the desired level, perhaps well above operating pressure, and the rate of pressure decline observed on the gauge 47a of apparatus 10a. After appreciating the foregoing, those of ordinary skill will readily understand how the apparatus 10 can be otherwise used in the installation and periodic testing of fluid dispensing systems like system 11.

While the principles of the invention have been described in connection with only a few embodiments, it is to be understood clearly that such embodiments are only by way of example and are not limiting.

I claim:

1. A pressure apparatus for use in analyzing the leak integrity of a fluid dispensing system having a single wall pipe line with at least one point along the length of the pipe line, the apparatus including:

a pressure gauge having a gauge enclosure;

a containment structure substantially surrounding the enclosure, the containment structure being threaded for removable connection to the joint; and the pressure gauge is mounted in a fixed relationship to the containment structure, whereby inadvertent fluid leaks from the enclosure of the pressure gauge are captured by the containment structure.

2. The apparatus of claim 1 wherein:
the containment structure includes a transparent panel; and,
the gauge is visible through the panel.

3. The apparatus of claim 2 wherein the transparent panel is removable.

4. The apparatus of claim 2 wherein the containment structure includes an opaque cover member.

5. The apparatus of claim 4 wherein the cover member is removable.

6. The apparatus of claim 1 wherein:
the containment structure includes a cover member removable for access to the fitting.

7. The apparatus of claim 6 wherein the cover member is opaque.

8. The apparatus of claim 1 wherein:
the pressure gauge is a first pressure device;
the apparatus includes a second pressure device having an enclosure; and,
the containment structure substantially surrounds the enclosures of both pressure devices.

9. The apparatus of claim 8 wherein:
the containment structure includes a transparent panel; and,
the gauge is visible through the panel.

10. The apparatus of claim 9 wherein:
the second pressure device is a fitting for attaching a pressure source to the apparatus; and,
the transparent panel is removable.

11. The apparatus of claim 9 wherein:
the second pressure device is a fitting for attaching a pressure source to the apparatus; and,
the apparatus includes a removable cover member for gaining access to the second pressure device.

12. The apparatus of claim 1 wherein:
the fluid dispensing system has a rated pressure; and,
the containment structure defines a pressure vessel having a rated pressure at least twice that of the fluid dispensing system.

13. The apparatus of claim 1 in combination with a fluid dispensing system having a flow path connecting (a) a reservoir, (b) a pump, and (c) a fluid dispenser, and wherein:
the flow path includes at least one valve dividing the path into a first path segment and a second path segment; and,
the apparatus is in flow communication with the first path segment.

14. The combination of claim 13 wherein:
the apparatus is a first apparatus;
the combination includes a second apparatus in flow communication with the second path segment.

15. The combination of claim 14 wherein each apparatus includes a pressure gauge.

16. A pressure apparatus for use in analyzing the leak integrity of a fluid dispensing system having a single wall pipe line having at least one joint along the length of the pipe line, the apparatus including:
a pressure fitting for attaching a pressure source to the apparatus, the fitting having an enclosure;
a containment structure substantially surrounding the fitting enclosure, the containment structure being threaded for connection to the joint; and
the pressure fitting is mounted in a fixed relationship to the containment structure, whereby inadvertent fluid leaks from the enclosure of the fitting are captured by the containment structure.

17. In combination, A. first and second pressure apparatus for use in analyzing the leak integrity of a fluid dispensing system and B. a fluid dispensing system having a flow path connecting (a) a reservoir, (b) a pump, and (c) a fluid dispenser, and wherein:
the flow path includes at least one valve dividing the path into a first path segment and a second path segment;
the first apparatus is in flow communication with the first path segment;
the second apparatus is in flow communication with the second path segment, and wherein each apparatus includes:
a pressure gauge having an enclosure; and
a containment structure substantially surrounding the enclosure, whereby inadvertent fluid leaks are captured by the structure.

* * * * *

UNITED STATES PATENT AND TRADEMARK OFFICE
CERTIFICATE OF CORRECTION

PATENT NO. : 5,390,532
DATED : February 21, 1995
INVENTOR(S) : Mark Antony

It is certified that error appears in the above-indentified patent and that said Letters Patent is hereby corrected as shown below:

On title page, item [19],
delete "Anthony" and insert --Antony--.

On title page, item [76] Inventor:
delete "Mark Anthony" and insert --Mark Antony--.

In column 6, line 60, delete "point" and insert --joint--.

Signed and Sealed this

Twenty-fifth Day of April, 1995

*Attest:*

BRUCE LEHMAN

*Attesting Officer*     *Commissioner of Patents and Trademarks*